United States Patent

Maxe

[15] 3,697,954

[45] Oct. 10, 1972

[54] MATRIX WITH INDUCTIVE ELEMENTS

[72] Inventor: Sven-Erik Maxe, Jakobsberg, Sweden

[73] Assignee: Svenska Dataregister AB, Solnar, Sweden

[22] Filed: Nov. 9, 1970

[21] Appl. No.: 87,724

[30] Foreign Application Priority Data

Nov. 19, 1969 Sweden ....................15580/69

[52] U.S. Cl. ..............................340/166 R, 317/137

[51] Int. Cl. ..............................................H04q 9/00

[58] Field of Search......................................340/166

[56] References Cited

UNITED STATES PATENTS 3,375,497 3/1968 Jones, Jr. et al. ...........340/166

*Primary Examiner*—Donald J. Yusko

*Attorney*—Norman Friedman, Stephen E. Feldman, Morris I. Pollack, Arthur T. Groeninger and Philip Furgang

[57] ABSTRACT

A matrix of inductive elements selectively actuated by drive circuitry utilizing thyristers. The drive circuitry is a chain of thyristers having the anode of each thyrister diode coupled to the gate circuit of the succeeding thyrister for insuring proper thyrister sequencing.

6 Claims, 7 Drawing Figures

INVENTOR
SVEN-ERIK MAXE
BY
ATTORNEY

INVENTOR
SVEN-ERIK MAXE
BY Philip Furgang
ATTORNEY

MATRIX WITH INDUCTIVE ELEMENTS

This invention relates to a matrix with inductive elements. In prior art devices of this type each inductive element are arranged between a column conductor and a row conductor and have thyristor current switches cooperating with each one of the column - and row conductors. The thyristors are normally biased in the forward direction (i.e., conducting state) by a signal applied to their control electrodes. Further, the anode-cathode circuit of each thyristor, is connected to the secondary winding of a transformer. The primary winding of the transformer together with the anode-cathode circuit of a second thyristor form a part of an oscillator circuit. The device functions such that when the second thyristor starts conducting, due to a signal being supplied to its control electrode, a voltage pulse with an emplitude and a polarity sufficient to cause the bias voltage on the first thyristor to be reversed and resetting it to a not conducting state, to be induced in the secondary winding. In addition, transient oscillations produced in the oscillator circuit causing the second thyristor to be biased in the open condition.

A disadvantage with such a device is that the circuitry for switching off the thyristors, cooperating with the column - and row conductors, is complex due to the need for a second thyristor, the required anode-cathode circuit of this thyristor and a secondary winding of a transformer and capacitors to form an oscillator circuit.

An object of this invention is to achieve switching sequentially of one thyristor after another, cooperating with the column and row conductors, by supplying the control electrodes of the thyristors with trigger pulses via a common conductor.

Figure 1:
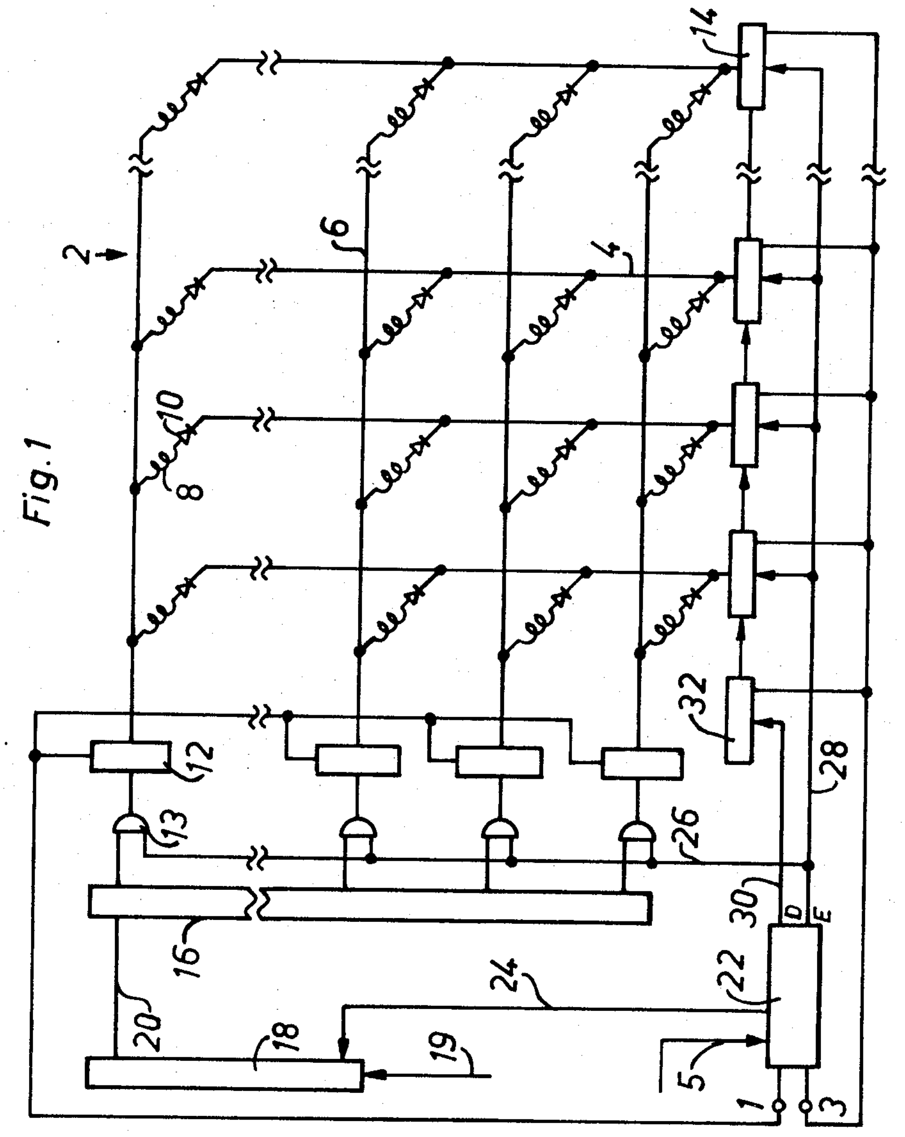
Figure 2:
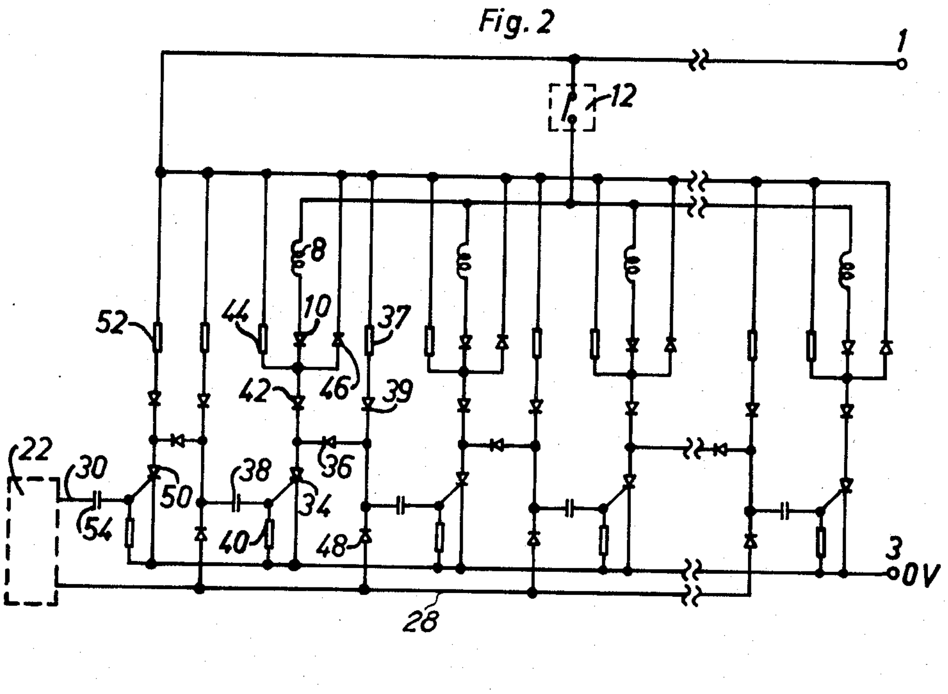

One embodiment of the invention is described with reference to the enclosed drawings on which FIG. 1 shows a block diagram of a matrix with inductive elements and drive circuits belonging thereto;

FIG. 2 shows a chain of column current switches, and

FIGS. 3 A, B, C, D, and E shows the waveforms for supplying voltage and control pulses.

In the embodiment to be described below the inductive elements are electromagnets. A matrix of electromagnets can be used, for instance at remote control of the keyboard of a business machine, e.g., an accounting machine or a cash register or can be used as an input terminal for a computer. An electromagnet is arranged for each one of the keys in the keyboard and by activating a magnet it performs a depression of a key. It is, however, obvious that the invention can be used in connection with other types of inductive loads, such as relays.

As is seen in FIG. 1, electromagnets 8 are arranged between column conductors 4 and row conductors 6 in series with diodes 10. The diodes prevent the "back current loops" through which other electromagnets except the desired one, can be activated. Each row conductor 6 is connected to a row drive circuit 12, using a thyristor as a current switch. The row drive circuits 12 are, however, not intended to be automatically switched in sequence. In a similar manner, each column conductor 4 is connected to a column drive circuit 14 using a thyristor as a current switch.

In the embodiment shown, each row drive circuit 12 is connected to the output of an AND-gate 13. One input terminal of each AND-gate 13 is connected to the output of a binary to decimal convertor 16. The binary to decimal convertor 16 converts binary digit information from a shift register 18 to decimal form. The shift register 18 is coupled to the binary to decimal convertor 16 via a conductor 20. Information is applied to the shift register 18 via an input conductor 19. In addition, there is arranged a currently supply - and control device 22, supplying the electromagnets 8 with current via row drive circuits 12 and column drive circuits 14 and supplying control pulses for control of the shift register 18 and the row - and column drive circuits 12 and 14. The device 22 supplies voltage between a terminal 1 and a terminal 3. Terminal 3 is used for a reference potential. In the embodiment shown this potential equals earth potential.

The device 22 supplies control pulses via a conductor 24 for control of the output, from the shift register 18. The conductor 26 is connected to the second input terminal of each AND-gate 13, and to conductor 28. A circuit 32 is coupled to device 22. The function of circuit 32 is more fully described with respect to FIG. 2.

Figures 3A, 3B, 3C, 3D, 3E:
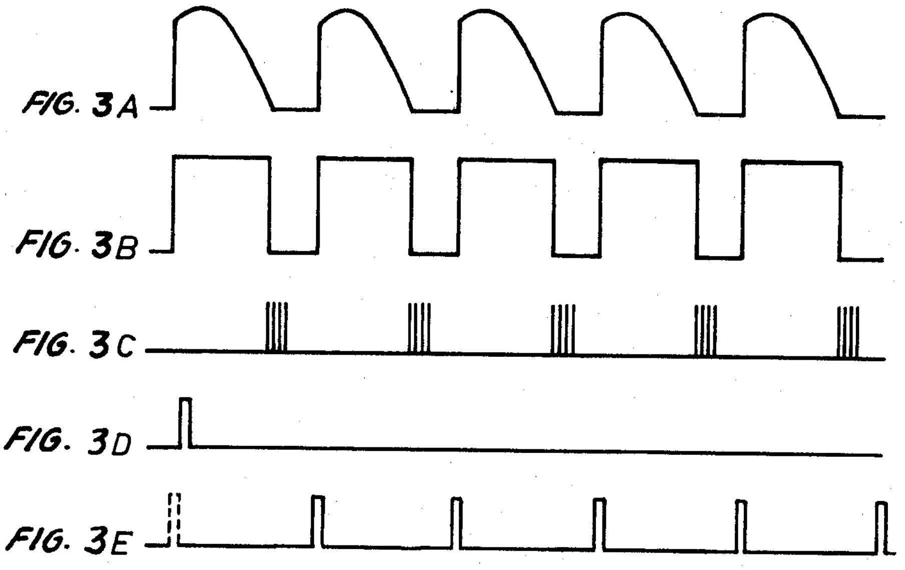

The current supply - and control device 22 works synchronously with the net frequency — the supply voltage has the shape shown in FIG. 3A. The recitified sine wave is needed for switching off the current passing a conducting thyristor, the current being able to decrease to zero before a new voltage pulse is applied. Of course, a free running oscillator can form a part of the device 22 for supplying the requested control pulses and for control of the time dependence of the supply voltage. In this case the supply voltage can have the shape shown in FIG. 3B. The current supply - and control device 22 can be designed in any conventional manner and is not going to be described in any greater detail. In addition, no description shall be made of the binary to decimal convertor 16 and or the shift register as these devices can be of any conventional type.

The chain of column drive circuits 14 are identical (shown in FIG. 2). The drive circuits 14 use a thyristor 34 as a current switch. The thyristor 34 includes one anode, one cathode, and one control electrode. The thyristor 34 is set to a conducting state when its anode has a positive potential with reference to its cathode and a positive pulse is fed to the control electrode.

In FIG. 2 one of the row drive circuits 12 is shown symbolicaly as a current switch, connected between the terminal 1 and the series connection of an electromagnet 8 and a matrix diode 10. This series connection is made for each column drive circuit. The anode of each thyristor 34 in the chain, except the last one, is connected to the cathode of a diode 36. The anode of diode 36 is connected via a capacitor 38 to the control electrode of the next thyristor in the chain. The capacitor 38 is charged via a circuit — includes the terminal 1 via a resistor 37, and a diode 39 to a potential exceeding the peak value of the trigger pulses on conductor 28. The resistor 37 is selected so that the charging current passing through the capacitor 38 will not be sufficient to turn on the thyristor but is sufficient for charging the capacitor 38 before the next trigger pulse arrives. Further, the diode 36 is arranged for permitting the capacitor 38 to be discharged through one thyristor 34 in the preceding stage, but prevents the capacitor 38 from being charged in the other than through the resistor 37 and the diode 39 and through the diode 48. The control grid of each thyristor 34 is connected to its cathodes via resistor 40. The cathode is grounded. The anode of each thyristor 34 is connected to the cathode of a diode 42. The anode of diode 42 is connected with the cathode of one of the matrix diodes 10. The diode 42 is arranged to prevent the capacitor 38 from being discharged in any other way than through the preceding thyristor 34 in the chain. Terminal 1 is coupled to the anode of diode 42 via a resistor 44 and a diode 46. The cathode of the diode 46 is connected to the terminal 1. The diode 46 is arranged for handling the inductive current when the voltage on terminal 1 is switched from the device 22.

The resistor 44 is arranged for securing the column drive circuit chain being stepped forward even if the figure zero appears. The device is so designed, that for the figure zero none of the electromagnets is activated. Thus, not one of the row drive circuits 12 passes supply voltage to the row conductors 6. If the resistor 44 did not exist, then the cooperating thyristor 34 would not be ignited and the next column drive stage would not be switched on by the following trigger pulse.

The cathode diode 48 is connected to the anode of diode 36 and to the capacitor 38. The anode of diode 48 is connected with conductor 28. Conductor 28 is connected with the device 22 for supplying trigger pulses to the thyristor.

The circuit 32 of FIG. 1, having a thyristor 50, is shown in FIG. 2 to the left of the chain of thyristors 34. This circuit 32 is not a column drive circuit stage but is built up in the same manner as the column drive stages except the load is a resistor 52. In addition this thyristor 50 is not ignited by pulses on the conductor 28. Instead, its control electrode is connected with device 22 via a capacitor 54 and conductor 30. The thyristor 50 is switched on by a pulse occuring at the same time as the supply voltage goes to zero. This will later be described in detail. The thyristor 50 is arranged for preparing the first thyristor 34 of the chain to receive an ignition pulse on the conductor 28. It provides a path for discharge of the capacitor 38 connected to its control electrode of a thyristor 34. After the capacitor 38 is discharged, the thyristor 50 is able to pass on ignition (or a shift) pulse appearing on conductor 28.

Some explanations shall be given in connection with FIG. 2. A start pulse, FIG. 3D, is produced every time a start condition is met. The start pulse is a signal to the device 22, via a conductor 5. This start pulse indicates that a new number consisting of several figures shall be transferred from the shiftregister 18. The pulse D of FIG. 3D is produced by the back edge of one of the trigger pulses (FIG. 3E) generated by the leading edge of the supply voltage. The trigger pulses appear on the conductors 26 and 28. The first trigger pulse E is dashed indicating this pulse is not igniting any column thyristor 34 as no start pulse D has yet arrived. In addition, a series of four shift pulses (FIG. 3C) is produced, starting each time when the supply voltage goes to zero. The pulses C are supplied to the shiftregister 18 for reading out a binary represented figure.

The function of the column drive circuit chain shown in FIG. 2 is now to be described with reference to FIGS. 1 and 3. The course of events for activating an electromagnet in the first column starts with the device 22 sending a start pulse, FIG. 3D, on the conductor 30. This pulse activates the thyristor 50. Thereafter, a series of four shift pulses are fed to the shiftregister 18 for selecting the first binary number representing decimal figures. The first number is fed via the conductor 16 to the binary to decimal convertor 16. The convert 16 converts the signal appearing at one of its nine output terminals. In FIG. 1 only four terminals are shown. Each output terminal of the binary to decimal convertor 16 is connected with one input terminal of the AND-gate 13. The converted first figure where this appears at the first input terminal of the AND-gates 13. The device 22 now produces trigger pulses on the conductors 26 and 28 (see FIG. 3E), and at this time the supply voltage increases from zero to a positive value (see FIG. 3A). The selected AND-gate 13, its first input terminal receiving a signal corresponding to the first figure, produces, when a trigger pulse appears at its second input terminal, an output signal to the corresponding row drive circuit 12. The thyristor 34 then works as a current switch for the drive circuit. It is ignited and the supply voltage is applied to the corresponding row conductor 6.

The start pulse on the conductor 30, (FIG. 3D) has earlier ignited the thyristor 50 causing the capacitor 38, situated in the control line of the first thyristor 34, to discharge through the diode 36, the thyristor 50, and the resistor 40. Now, when a trigger pulse appears on the conductor 28, the diode 48 of the first thyristor 34 circuit of the chain is biased in the forward direction and passes the trigger pulse. The trigger pulses are applied through the capacitor 38 to the control electrode of the thyristor 34. The thyristor 34 ignites and thereby a closed current loop is produced from the terminal 1 via the thyristor 34 arranged in the row drive circuit, the row conductor 6, the electromagnet 8, the matrix diode 10, the diode 42, and the thyristor 34 to ground. Thus, an activation of the selected electromagnet 8 is provided. When the supply voltage has decreased to zero and the current has deceased, the two thyristors that have been ignited (row -colum thyristors 34 respectively) are automatically switched off and therefore no special reset circuit of the kind described in the Swedish patent application as published for public no. 309,998 is needed.

When the supply voltage goes to zero after the first figure has been handled, the device 22 produces a new shift order to the shift register 18 and a new figure is taken out from the register and fed to the binary to decimal converter 16. When the first thyristor 34 of the chain was conducting, the capacitor 38 situated in the control line of the second thyristor 34, was discharged whereby the capacitor 38 was prepared for passing the next trigger pulse from the device 22. Each capacitor 38, is mentioned previously, is normally charged to a potential exceeding the peak value of the trigger pulse. Hence a trigger pulse can only ignite by a thyristor 34 when the capacitor 38 situated in its control circuit has been discharged due to the preceding thyristor 34 of the chain being switched on. The procedure is similar when transferring other binary stored figures in the shift register 18. The figures being converted to signals represent decimal figures and activate a selected electromagnet 8. Thus, the figures in the shift register 18 are stored column by column, the first figure activating an electromagnet in the third column, etc.

Thus, this invention provides a matrix arrangement with coupling electromagnets, row drive circuits, column drive circuits which drive circuits including thyristor current switches, and coupling a supply voltage of pulses. Thus, no complex switching off circuits for thyristors are needed. In addition, another desirable object is achieved, i.e., by supplying trigger pulses to all thyristors in the column drive circuits via a common conductor, the column drive circuits are switched sequentially without the need of any column selecting device.

What is claimed:

1. Matrix arrangement with inductive elements, each element being arranged between one column conductor and one row conductor, the arrangement having controlled rectifiers, working as current switches cooperating with each column conductor and row conductor, characterized in that the supply voltage, being positive pulses, is applied to each circuit formed by a controlled rectifier cooperating with a row conductor, an inductive element and a controlled rectifier cooperating with a column conductor, and that the controlled rectifiers cooperating with the column conductors form a chain, in which chain these controlled rectifiers are sequentially switched, each anode of the controlled rectifiers in the chain being connected, via a first rectifier and a capacitive element with the control electrode of the next rectifier in the chain, the connection point between the first rectifier and the capacitive element being supplied with trigger pulses via a second rectifier, the mentioned connection point being connected with a source for charging the capacitive element to a potential exceeding the peak value of the trigger pulse and that between the anode of each controlled rectifier in the chain and each inductive element belonging hereto a third rectifier is connected, this last mentioned rectifier having the same direction of conduction as the controlled rectifier in the chain, the arrangement being so designed that a controlled rectifier in the chain starts conducting when the capacitive element of the control circuit has been discharged, this discharge has taken place when the preceding controlled rectifier has been conducting, the capacitive element has discharged via the first rectifier and the preceding controlled rectifier, the supply voltage being positive, simultaneously as a trigger pulse appears at the connection point between the first rectifier and the capacitive element, the controlled rectifier (34) in the chain being set to not conducting state when the supply voltage, after the positive pulse, is zero.

2. Matrix arrangement as recited in claim 1, characterized in that the anode of the third rectifier being connected to the inductive element, the cathode of the rectifier being connected to a point, which point by a resistive element is connected to the supply voltage and via the anode and cathode of a fourth rectifier is connected to the anode of the controlled rectifier cooperating with a column conductor.

3. Matrix arrangement as recited claim 2, characterized in that the anode of a fifth rectifier being connected to the connection point between the third rectifier and the fourth rectifier, the cathode of the fifth rectifier being connected to the supply voltage.

4. Matrix arrangement as recited in claim 1, characterized in that the capacitive element in the control circuit of each controlled rectifier cooperating with each column conductor, is connected to the supply voltage via a sixth rectifier and a resistive element.

5. Matrix arrangement according to any one of the preceding claims, characterized in that an additional controlled rectifier, for preparing the first controlled rectifier in the chain to be activated by a trigger pulse, is so arranged that when it is activated by a start pulse it forms a discharge path for the capacitive element situated in the control circuit of the first controlled rectifier in the chain.

6. Matrix arrangement according to any one of the preceding claims, characterized by the controlled rectifiers being thyristors.

* * * * *